Patented Dec. 11, 1945

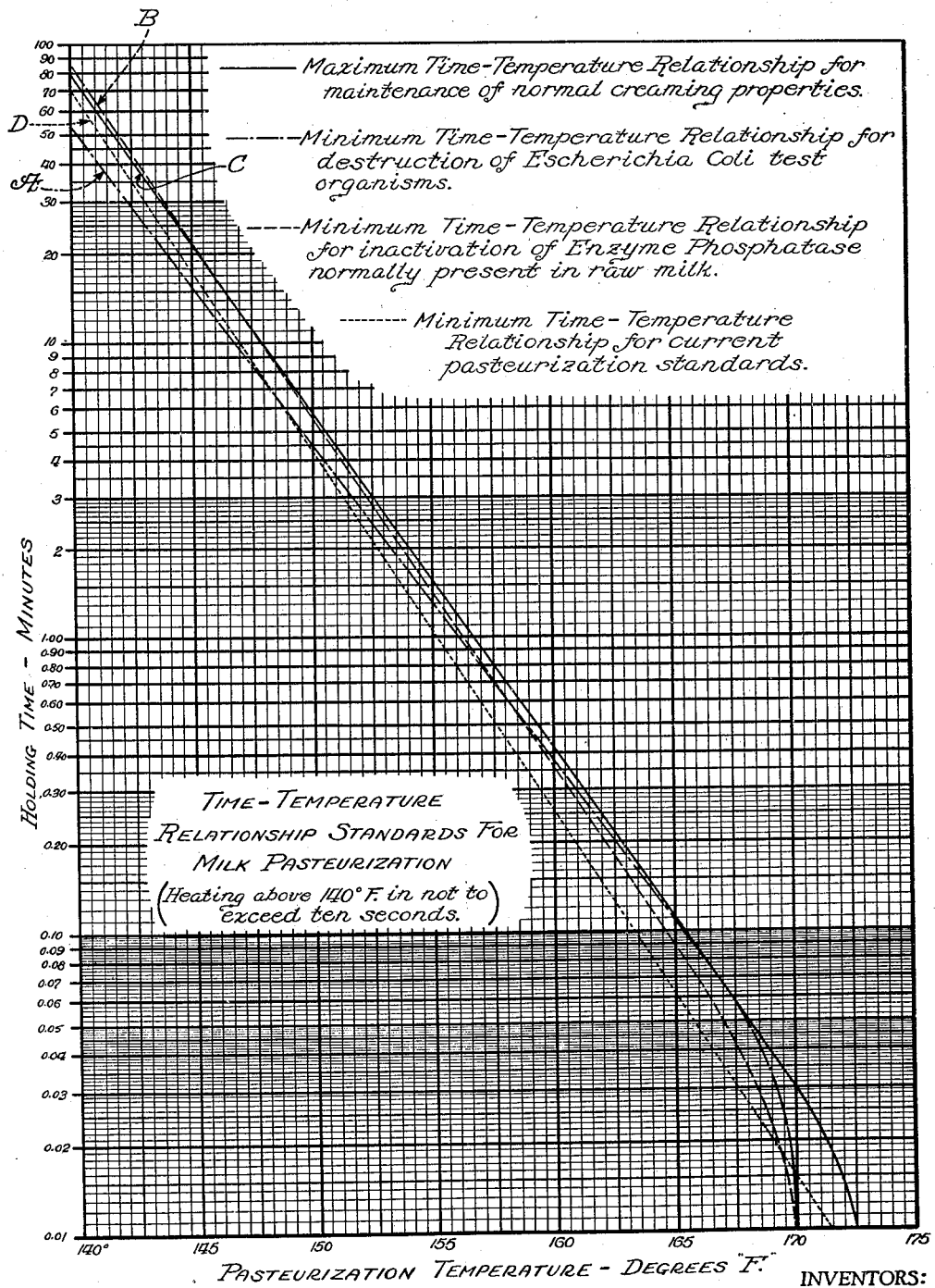

2,390,872

UNITED STATES PATENT OFFICE 2,390,872

PROCESS OF PASTEURIZING MILK

Arthur C. Dahlberg, Geneva, and Robert F. Holland, Seneca Castle, N. Y., assignors, by mesne assignments, to Cherry-Burrell Corporation, Chicago, Ill., a corporation of Delaware Application November 4, 1940, Serial No. 364,134

2 Claims. (Cl. 99—212)

This invention relates to improvements in methods of pasteurization. More particularly the invention relates to improvements in the method of pasteurizing milk and the invention is especially described in connection with such a process. The invention is, however, not necessarily limited to the pasteurization of milk but may also be adapted to the pasteurization of other substances, such as, for example, cream, fruit juices, etc.

In milk, particularly cow's milk, various types of bacteria are present. Some of the bacteria are naturally present in the milk at the time of milking. However, during the milking procedure and shortly thereafter, the milk frequently becomes contaminated with certain other types of bacteria. The more common types of bacteria which have from time to time been found in unpasteurized milk may for convenience be divided into two general classes. These classes are the disease-producing bacteria, which is by far the smaller class, and bacteria which are generally considered not to be disease-producing, which is the larger class and is almost always present in raw milk.

One of the purposes of pasteurizing milk intended for human consumption is to destroy the disease-producing bacteria which may be present, as well as to destroy many types of bacteria present in the milk which are not of the disease-producing type. Some of the more common bacteria of the disease-producing type which may occasionally be found in unpasteurized milk are *Mycobacterium tuberculosis, Streptococcus pyogenes, Eberthella typhi, Corynebacterium diphtheriae* and *Brucella abortus.* These various types of bacteria can all be satisfactorily destroyed in the milk by the proper pasteurization thereof, thereby preventing the possible development of such common human diseases as tuberculosis, septic sore throat, typhoid fever, diphtheria and undulant fever which may otherwise result from the use of unpasteurized but contaminated milk.

Some of the more common bacteria present in unpasteurized milk which are not commonly considered to be disease-producing are *Escherichia coli, Aerobacter aerogenes, Streptococcus lactis* and *Lactobacillus bulgaricus.* A large proportion of the bacteria forming the last mentioned group may also be destroyed by proper pasteurization of the milk, thereby improving the flavor and keeping qualities thereof.

Though there are various methods of pasteurizing milk each of the methods to effectively destroy bacteria contaminating the milk must conform to certain temperature and time relationships. The time-temperature relationship selected determines the period of time during which the milk being pasteurized must be maintained or held at the selected temperature to effect good pasteurization. Various tests may be resorted to in order to determine the efficiency of a pasteurizing process. Two tests, however, appear to be the most reliable and commonly used, efficient indicators of good pasteurization. The first test in point of common usage may be said to be that involving the destruction of test organisms, such as a selected strain of *Escherichia coli.* This particular strain of test organisms has been selected as a desirable test organism for the reason that it is easily obtainable, withstands more rigorous heat treatment than the more common types of disease-producing bacteria and can be handled with a minimum of danger. The second test commonly considered to be a satisfactory one for good pasteurization involves the inactivation of the enzyme phosphatase present in the milk.

Though either of the above mentioned tests of good pasteurization may in itself comprise a sufficient one, a more satisfactory test is secured by combining both. When both tests are combined and the pasteurization of the milk is carried out at a pasteurizing temperature for an adequate period of time to produce a sufficiently severe heat treatment necessary to satisfy both of the aforementioned tests of good pasteurization, then a more perfectly processed milk will be secured.

The destruction of pathogenic bacteria, as well as various other kinds of bacteria, is one of the prime purposes of good pasteurization and, though reliable tests or indicators of such pasteurization are desirable, a satisfactory pasteurization process which can accomplish the desired results from a bacteriological standpoint must also be able to achieve certain preferred results from a physical standpoint. The physical results desired in satisfactory pasteurization of milk are the maintenance throughout the pasteurization process of the "creaming" and flavor properties of the milk. The critical points for the destruction of the physical properties of the milk, as above referred to, due to the severe heat treatment of the milk as it is being pasteurized within a given range of temperature, are very closely related and in frequent instances overlap the critical points in the proper pasteurization of milk from a bacteriological standpoint through the same range of temperature in which milk may be satisfactorily pasteurized for commercial use. It is the attainment of these last two desired characteristics of good pasteurization, i. e., the maintenance of the "creaming" and flavor properties of the milk, which are some of the chief purposes of this invention and which in the past have not been satisfactorily attainable in commercial pasteurizing processes which were also satisfactory from a bacteriological standpoint.

The flash pasteurization process was the first to become commercially significant. The process involved the continuous heating of milk to temperatures varying approximately between 165° F. and 185° F. The heating of the milk was accomplished in a heater in which the heated milk was intermingled with the incoming milk which was to be heated. The heater was usually equipped with a rotary agitator which mixed the heated and unheated milk. Such a procedure obviously would not be very accurately controllable and the required period for the heating of milk from one temperature to another may vary greatly. As a result of such lack of control and fluctuation in the time required for heating milk, the milk was frequently overheated during the pasteurizing process, developing therefrom a cooked flavor. It was also observed that, as a result of such a process of heating the milk, the "creaming" properties thereof were usually impaired. Obviously by such an inaccurate procedure the satisfactory reduction in the bacterial count of the milk, due to the pasteurization thereof, would be an uncertainty.

The assurance of more efficient bacterial destruction and the avoidance of the likelihood of imparting a cooked flavor to the milk while it was being pasteurized necessitated the shifting of commercial pasteurization of milk from the flash or high temperature pasteurization process to the lower temperature pasteurization process in which it was necessary to hold or maintain the milk for a longer period of time to accomplish the desired bacterial destruction. This latter process of pasteurization, though it improved the efficiency of bacterial destruction, also impaired the "creaming" properties of the milk and in frequent instances also adversely affected the flavor of the milk.

Since the low temperature pasteurization of milk requires the "holding" or maintaining of the milk at the pasteurizing temperature for a long period of time, much more equipment is required for pasteurizing a given quantity of milk in a given period of time by the low temperature process than is required in the pasteurization of the same quantity of milk by the high temperature process. Various efforts have, therefore, been made to perfect a high temperature pasteurization process by which milk may be perfectly pasteurized from a bacteriological standpoint without impairing the "creaming" and flavor properties of the milk.

The prime objects of this invention are, therefore, to provide a new and novel short time, high temperature pasteurization process in which the "creaming" properties, as well as the flavor of the milk, will not be impaired; in which the bacterial counts in the pasteurized product are reduced; in which all disease-producing bacteria and a maximum of other types of bacteria are destroyed, which destruction may readily be established by suitable tests involving the destruction of test organisms and inactivation of enzyme phosphatase commonly used as indicators of efficient pasteurization; and to provide an expeditious and efficient method of pasteurization which will enable the securing of these improved results in a substantially reduced period of time required for the pasteurization of the milk.

The foregoing objects and other important features of the invention will become more apparent as the nature of the invention is better understood. The particular features and advantages of the invention are well set forth in the following description which should be read in connection with the accompanying chart.

In the accompanying chart the lines A and B indicate the minimum time and temperature relationship through a given temperature range essential for the suitable pasteurization of the milk from a bacteriological standpoint. The line C of the chart indicates the maximum time and temperature relationship permissible in the pasteurization of milk through a given temperature range without impairing the "creaming" properties of the milk. The line D of the chart indicates the present standards of time and temperature relationship for commercial pasteurization.

Obviously, therefore, a perfect pasteurization of the milk from the standpoint of destruction of bacteria should take place at a temperature and for a period of time in excess of the time required to destroy the pathogenic bacteria and a maximum of other types of bacteria present in the milk as shown by the bacterial destruction and phosphatase inactivation lines A and B of the accompanying chart. However, the milk being so pasteurized at the specific temperature should not be held for a period of time in excess of that designated by line C of the chart, at which time the "creaming" properties of the milk would become impaired.

Such a suitable time and temperature relationship must fall to the left of line C and to the right of both of the lines A and B. As clearly indicated by the accompanying chart, such a suitable time and temperature relationship can only be found within two portions of the temperature range covered by the accompanying chart, i. e., approximately between the temperatures 152° F. and 162° F. and approximately between the temperatures 168° F. and 172° F. In the first mentioned temperature range the intervening period of time between the time and temperature relationship required to destroy the bacteria in the milk and the time and temperature relationship at which the "creaming" properties of the milk will be impaired is extremely short. For this reason the second mentioned temperature range, i. e., approximately between 168° F. and 172° F., which affords a greater intervening period between the time and temperature required to destroy the bacteria and the time and temperature required to impair the "creaming" properties of the milk is the more desirable range of temperature for the pasteurization of milk according to this new and improved process.

As indicated in the preceding paragraph, the improved pasteurization process is preferably practiced between 168° F. and 172° F. The ideal temperature for the pasteurization of milk according to the improved process would appear to be 170° F. In the preceding paragraphs no indication has been made of the manner in which the new process effects a maintenance of the flavor of the pasteurized milk. The manner in which the impairment of the flavor of the milk during the pasteurization thereof is avoided by this new process is one of the prime improvements over the prior method of pasteurization accomplished by this invention.

As in the case of the "creaming" properties of milk, the flavor of the pasteurized milk is also directly related to the temperature at which the milk is processed and the period of time required for the completion of the processing or pasteurizing of the milk. However, in the case of the flavor of the milk, the time required for heating the milk above the temperature of approximately 140° F. to the pasteurizing temperature, the period during which the milk is maintained at the pasteurizing temperature and the period of time required for cooling the milk from the pasteurizing temperature back to approximately 140° F. or lower is of great importance. It has been found that, in order to avoid impairing the flavor of the milk, the combined heating, "holding" and cooling periods should be reduced to a minimum. It has further been found, by extensive experimentation, that the period for heating the milk above the temperature of 140° F. should be substantially instantaneous, that is, not substantially in excess of ten seconds, preferably five to eight seconds, and that, upon the completion of the "holding" of the milk at the pasteurization temperature for a sufficient period of time to destroy the bacteria in the milk, the milk should then be cooled as rapidly as possible, that is, substantially instantaneously, to at least 140° F. in a period of time not exceeding ten seconds, preferably within five seconds.

In the accompanying chart the curves A, B, C and D have been plotted for the temperature-time relationship required for the perfect pasteurization of milk when heated from 140° F to the indicated pasteurizing temperature in a period of time not to exceed ten seconds, which heating period was found to be the maximum permissible for heating above 140° F. It should be noted that all of the results desired in the perfect pasteurization of milk may be attained by the previously described process when the pasteurization takes place at a temperature of approximately 170° F. and when the milk has been heated from 140° F. in a period of time not to exceed ten seconds and then rapidly cooled in a period of time not to exceed ten seconds.

According to the improved process or method of pasteurization the raw or unpasteurized milk may be heated to approximately 140° F. by any conventional procedure and, in all probability, will be so heated in a period of time not to exceed a few minutes. The milk is then heated from approximately 140° F. to the desired pasteurizing temperature of 170° F. in a period of time not substantially exceeding ten seconds whereupon the milk is then promptly and rapidly cooled to approximately 140° F. in a period of time not substantially exceeding five seconds.

It should be noted at this point that the most desirable results are secured if the period of time for heating the milk from 140° F. to 170° F. does not exceed ten seconds and if the period of time for cooling the milk from 170° F. to 140° F. does not exceed ten seconds. It will be observed from the chart that at 170° F. no "holding" period is necessary to complete the destruction of the bacteria in the milk according to both the bacterial destruction test and the inactivation of the phosphatase test.

It is, therefore, readily possible to complete the entire operations incidental to the pasteurization of the milk above 140° F. in a period of time not to exceed twenty seconds. The most desirable results are obtained when the milk is heated from 140° F. to 170° F. in from five to eight seconds and then cooled to approximately 140° F. in from five to ten seconds. However, though, as indicated by the chart, the milk when being pasteurized at 170° F. does not require a "holding" thereof at that temperature to complete the destruction of the bacteria, yet the milk may be held for a period of approximately two to four seconds after reaching that temperature before the "creaming" properties of the milk would be impaired. This possible "holding" of the milk after the destruction of the bacteria has taken place and before the "creaming" properties of the milk are impaired enables a certain flexibility in this extremely short process which permits the ready and satisfactory adaptation thereof to commercial practice by the use of commercially available pasteurizing equipment.

The foregoing described improved process of pasteurizing milk may, as just stated, be successfully practiced in various types of commercial equipment which may readily be adapted for such use. For example, the process may be practiced in the commercial "plate" type heat exchangers or in the "internal tube" type heat exchangers, both of which are commercial types of pasteurizing equipment. In each of such types of equipment the milk is rapidly forced through the heat exchanger in an attenuated body whereby the rapid heating, cooling and precision "holding" thereof may be readily attained.

A perfect pasteurization of milk should have certain definite, predetermined and controllable effects on the milk. Such pasteurization should comply with certain standards. The standards of pasteurization should provide for the destruction of the pathogenic bacteria, as well as the maximum number of other types of bacteria present in the milk. The destruction of such bacteria should be established by the inactivation of the enzyme phosphatase in the milk and the destruction of selected test organisms, such as *Escherichia coli*. The "creaming" properties of the milk should not be impaired and the flavor thereof should not be changed. Each of these requirements is attainable by the herein described improved new and novel method of pasteurization which, in addition to the above advantages, also reduces the overall time required for the perfect pasteurization of milk, thereby attaining several new improved results not heretofore attainable by the previously known methods of pasteurization.

The invention is hereby claimed as follows:

1. The biophysical process of pasteurizing milk containing enzyme phosphatase and *Escherichia coli* which comprises, preheating the milk to a temperature of approximately 140° F., heating the milk in a period of time less than 10 seconds from a temperature of approximately 140° F. to a temperature of approximately 170° F., holding the milk at said last mentioned temperature for a period of time of approximately 4 seconds or less, cooling the milk subsequent to said holding period from the temperature of approximately 170° F. to a temperature of approximately 140° F. or less in a period of time less than 10 seconds, said heating, holding and cooling operations being accomplished at the specified temperatures and in a period of time of approximately 20 seconds or less during which period of time the creaming properties of the milk are maintained and the enzyme phosphatase is inactivated and the *Escherichia coli* is destroyed.

2. The biophysical process of pasteurizing milk containing enzyme phosphatase which comprises, preheating the milk to a temperature of approximately 140° F., heating the milk in a period of time less than 10 seconds from a temperature of approximately 140° F. to a pasteurizing temperature of approximately 170° F., cooling the milk from said pasteurizing temperature of approximately 170° F. after the milk has been pasteurized to a temperature of approximately 140° F. or less in a period of time less than 10 seconds, said heating and cooling operations being accomplished at the specified temperatures and in an overall period of time of approximately 20 seconds or less during which overall period of time the creaming properties of the milk are maintained and the enzyme phosphatase is inactivated.

ARTHUR C. DAHLBERG.
ROBERT F. HOLLAND.